(12) United States Patent
Zhang

(10) Patent No.: US 8,990,429 B2
(45) Date of Patent: Mar. 24, 2015

(54) HTTP-BASED SYNCHRONIZATION METHOD AND APPARATUS

(75) Inventor: Shaobo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 13/492,480

(22) Filed: Jun. 8, 2012

(65) Prior Publication Data

US 2012/0246258 A1  Sep. 27, 2012

Related U.S. Application Data

(63) Continuation of application No. PCT/CN2010/080394, filed on Dec. 28, 2010.

(30) Foreign Application Priority Data

Jan. 22, 2010 (CN) .......................... 2010 1 0103230

(51) Int. Cl.
- G06F 15/16 (2006.01)
- H04W 56/00 (2009.01)
- H04L 29/08 (2006.01)

(52) U.S. Cl.
CPC ............... H04W 56/00 (2013.01); H04L 67/02 (2013.01)
USPC .......................................... 709/248; 713/400

(58) Field of Classification Search
CPC .................................................. G06F 15/167
USPC .................................. 709/213, 248; 713/400
See application file for complete search history.

(56) References Cited

U.S. PATENT DOCUMENTS

| 6,411,998 B1* | 6/2002 | Bryant et al. ................. 709/224 |
| 2008/0019398 A1 | 1/2008 | Genossar et al. |
| 2009/0110132 A1 | 4/2009 | Kondrad et al. |
| 2009/0210459 A1* | 8/2009 | Nair et al. ..................... 707/203 |
| 2009/0276535 A1 | 11/2009 | Saunders et al. |
| 2009/0327318 A1* | 12/2009 | Peacock ........................ 707/100 |

FOREIGN PATENT DOCUMENTS

| CN | 1712983 A | 12/2005 |
| CN | 101282348 A | 10/2008 |

(Continued)

OTHER PUBLICATIONS

Network W@orking Group, R. Fielding, Hypertext Transfer Protocol—HTTP/1.1, Jun. 1999.*

(Continued)

Primary Examiner — David Lazaro
Assistant Examiner — Marie Georges Henry
(74) Attorney, Agent, or Firm — Brinks Gilson & Lione

(57) ABSTRACT

An HTTP-based synchronization method includes obtaining a first response sent by a source server or a cache in response to an HTTP request for obtaining a file; determining time when the first response is sent in local time at server, according to a value of a Date field and a value of an Age field in the first response; determining time when the first response is sent in local time at client, according to the client time of an event related to the first response; and determining time offset between the server time and the client time according to the time when the first response is sent in local time at server and the time when the first response is sent in local time at client, and setting up a synchronization relationship between the client time and the server time.

10 Claims, 9 Drawing Sheets

(56) References Cited

FOREIGN PATENT DOCUMENTS

| CN | 100492944 C | 5/2009 |
|---|---|---|
| CN | 101425891 A | 5/2009 |
| CN | 101516057 A | 8/2009 |
| CN | 101557255 A | 10/2009 |
| WO | WO 2008050752 A1 | 5/2008 |

OTHER PUBLICATIONS

International Search Report issued in corresponding PCT Patent Application No. PCT/CN2010/080394, mailed Apr. 21, 2011.
Telefon AB LM Ericsson, "HTTP Streaming" Agenda Item 7, TSG-SA4#54 Meeting, Ystad, Sweden, Jun. 22-26, 2009.
Nokia Corporation, "Dynamic HTTP Streaming" 3GPP TSG-SA4 MBS Ad-hoc. Seattle, Washington, Sep. 28-Oct. 1, 2009.
Research in Motion, "Tuning into a Live HTTP Stream with Client Controlled Adaption" Agenda Item 8, 3GPP TSG-SA4 #55. Kista, Sweden, Aug. 17-21, 2009.
Written Opinion of the International Searching Authority issued in corresponding PCT Patent Application No. PCT/CN2010/080394, mailed Apr. 21, 2011.
Office Action with Search Report issued in corresponding Chinese Patent Application No. 201010103230.2, mailed Jul. 10, 2012.
Fielding et al., "Hypertext Transfer Protocol—HTTP/1.1" Network Working Group, Jun. 1999.
Office Action issued in corresponding Chinese Patent Application No. 201010103230.2, mailed Sep. 18, 2012.
Extended European Search Report issued in corresponding European Patent Application No. 10843765.8, mailed Oct. 19, 2012.
Fielding, Ed., "HTTP/1.1, part 6: Caching" HTTPbis Working Group, Oct. 26, 2009.
Huawei Technologies Co. Ltd., "Live Content Support in Static HTTP Streaming" Agenda Item 6, 3GPP TSG-SA4 #56. Sophia-Antipolis, France, Nov. 9-13, 2009. S4-090857.
Office Action issued in corresponding Chinese Patent Application No. 201010103230.2, mailed Nov. 30, 2012.

\* cited by examiner ns, the inventor
HTTP-BASED SYNCHRONIZATION METHOD AND APPARATUS

CROSS-REFERENCE TO RELATED APPLICATIONS

This application is a continuation of International Application No. PCT/CN2010/080394, filed on Dec. 28, 2010, which claims priority to Chinese Patent Application No. 201010103230.2, filed on Jan. 22, 2010, both of which are hereby incorporated by reference in their entireties.

FIELD OF THE APPLICATION

The present application relates to the field of network technologies, and in particular, to an HTTP-based synchronization method and apparatus.

BACKGROUND OF THE APPLICATION

Traditional streaming services are based on a real-time transport protocol and a real time control protocol. This type of streaming service requires special streaming servers, and encounters the hinder of traversing the firewall. However, HTTP (Hypertext Transfer Protocol, Hypertext Transfer Protocol) transmission is free from such problems. Due to wide application of the web, plenty of basic facilities such as web server and content distribution network (CDN) can support HTTP transmission. The application of HTTP-based media streaming is gaining increasingly wide application.

In the traditional live media streaming service, the client uses specially defined time "now" (now) to indicate the start time for the server to stream the media data. The server keeps sending the content that starts from the specified time to the client, and the client needs to simply receive and stream the media stream sent by the server, without caring whether the local time is synchronous to the server time.

In the live streaming service of HTTP streaming (HTTP Streaming), the server responds passively by sending specified content fragments to the client as requested by the client. To implement live streaming, the client continues requesting the media fragments from the server, and directly or indirectly uses time to indicate requested media fragments. Such requests are interpreted by the server in terms of the local time at the server. Besides, in the HTTP streaming, "now" defined in traditional streaming service is not applicable because "now" is uncertain time and needs to be interpreted by "intelligence" of the server. The simple file server used by the HTTP streaming has no "intelligence". Therefore, the client needs to set up a time synchronization relationship with the server, and to apply the server time rather than the local time in the request. Otherwise, the server cannot accurately interpret the request from the client, and cannot implement the live streaming service.

To solve the foregoing synchronization problem, a method in the prior art applies a dynamically updated media data index. That is, a media fragment index is maintained on the server to record the time interval or the sequence number, and the storage location of each media fragment. With generation of the media fragment, the server updates the index in real time. The client can obtain the information about the latest media fragment from the index. In the solution, the time synchronization is an implicit and continuous process. The essence of the client requesting the index file is a process of setting up synchronization. The media fragment index is updated once, the client can obtain a media fragment.

In the process of implementing embodiments, the inventor finds that: In the live streaming, the media fragment is generated in real time. To obtain the latest media fragment, the client needs to first request the media fragment index from the server and obtain the information about the latest media fragment, then the client can request the media fragment from the server. Frequent update and reading of the media fragment index increase the load of the server. Moreover, the load of the server increases with increase of users. Secondly, the request and the transmission of the media fragment index consume the bandwidth and increase delay of media stream. Therefore, the solution in the prior art does not well solve the issue of synchronization between the client and the server.

SUMMARY OF THE APPLICATION

Embodiments provide an HTTP-based synchronization method and apparatus, which make full use of the mechanism in the existing HTTP, and effectively solve the problem of synchronization between client and server without additionally increasing communication overhead between a client and a server.

An embodiment provides an HTTP-based synchronization method, including:

obtaining a first response sent by a source server or a cache in response to an HTTP request for obtaining a file;

determining time when the first response is sent in local time at server, according to a value of a Date field and a value of an Age field in the first response;

determining time when the first response is sent in local time at client, according to the client time of an event related to the first response; and determining time offset between the server time and the client time according to the time when the first response is sent in local time at server and the time when the first response is sent in local time at client, and setting up a synchronization relationship between the client time and the server time.

An embodiment provides an HTTP-based synchronization apparatus, including:

a transceiver module, configured to obtain a first response sent by a source server or a cache in response to an HTTP request for obtaining a file;

a first determining module, configured to determine time when the first response is sent in local time at server, according to a value of a Date field and a value of an Age field in the first response obtained by the transceiver module;

a second determining module, configured to determine time when the first response is sent in local time at client, according to the client time of an event related to the first response; and a synchronizing module, configured to determine time offset between the server time and the client time according to the time when the first response is sent in local time at server determined by the first time determining module, and the time when the first response is sent in local time at client determined by the second time determining module, and set up a synchronization relationship between the client time and the server time.

In the technical solutions provided in the embodiments, the time when the first response is sent in local time at server is determined according to the value of the Date field and the value of the Age field in the first response, and the time offset between the server time and the client time is determined according to the time when the first response is sent in local time at server and the time when the first response is sent in local time at client, so as to set up the synchronization relationship between the client time and the server time. In this way, the mechanism in the existing HTTP protocol is made full use of, and the problem of synchronization between the client time and the server time is solved effectively without additionally increasing communication overhead between a client and a server.

BRIEF DESCRIPTION OF THE DRAWINGS

To describe the technical solutions more clearly, the following outlines the accompanying drawings for describing the embodiments. The accompanying drawings outlined below are merely about some embodiments, and persons of ordinary skill in the art can derive other drawings from the accompany drawing herein without making any creative effort.

DETAILED DESCRIPTION OF THE EMBODIMENTS

Technical solutions in embodiments are described clearly and comprehensively with reference to the accompanying drawings in the embodiments. Apparently, the embodiments to be described are merely some rather than all of the embodiments. All other embodiments derived by those skilled in the art from the embodiments given herein without any creative effort shall fall within the protection scope of the claims.

The technical solutions provided in the embodiments can be applicable to a scenario of time synchronization based on HTTP, and are not limited to be applicable in HTTP Streaming for supporting the live streaming service. In an HTTP protocol, the source server and each level of cache in the network have a reliable clock as a synchronization source. It may be regarded that they have a same reference time, and the reference time may be called server time. A cache without a reliable clock is not allowed to store an HTTP response. A client device that runs a client does not need to meet such a condition. For example, a mobile phone, computer or the like has a local clock which may be called client time and is not required to be synchronous to an external clock in general application. When synchronization between server time and client time is required, the technical solutions provided in the embodiments may be adopted.

Figure 1:
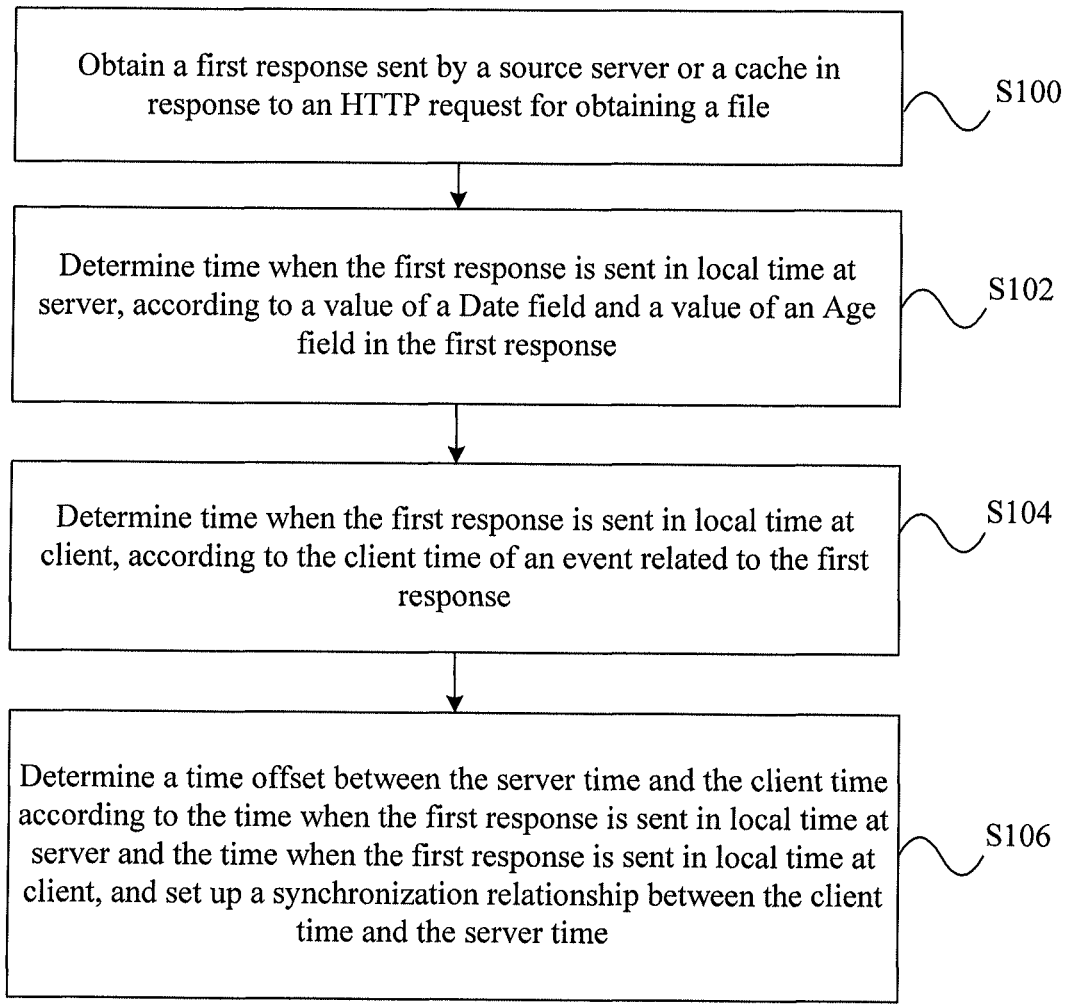
FIG. 1 is a flowchart of an HTTP-based synchronization method according to an embodiment.

FIG. 1 is a flowchart of an HTTP-based synchronization method according to an embodiment. As shown in FIG. 1, the embodiment includes the following steps:

S100. Obtain a first response sent by a source server or a cache in response to an HTTP request for obtaining a file.

S102. Determine time when the first response is sent in local time at server, according to a value of a Date field and a value of an Age field in the first response.

S104. Determine time when the first response is sent in local time at client, according to the client time of an event related to the first response.

S106. Determine time offset between the server time and the client time according to the time when the first response is sent in local time at server and the time when the first response is sent in local time at client, and set up a synchronization relationship between the client time and the server time.

In the method provided in the embodiment, the time when the first response is sent in local time at server is determined according to the value of the Date field and the value of the Age field in the first response, and the time offset between the server time and the client time is determined according to the time when the first response is sent in local time at server and the time when the first response is sent in local time at client, so as to set up the synchronization relationship between the client time and the server time. In this way, the mechanism in the existing HTTP protocol is made full use of, and the problem of synchronization between the client time and the server time is solved effectively without additionally increasing communication overhead between a client and a server.

Figure 2A:
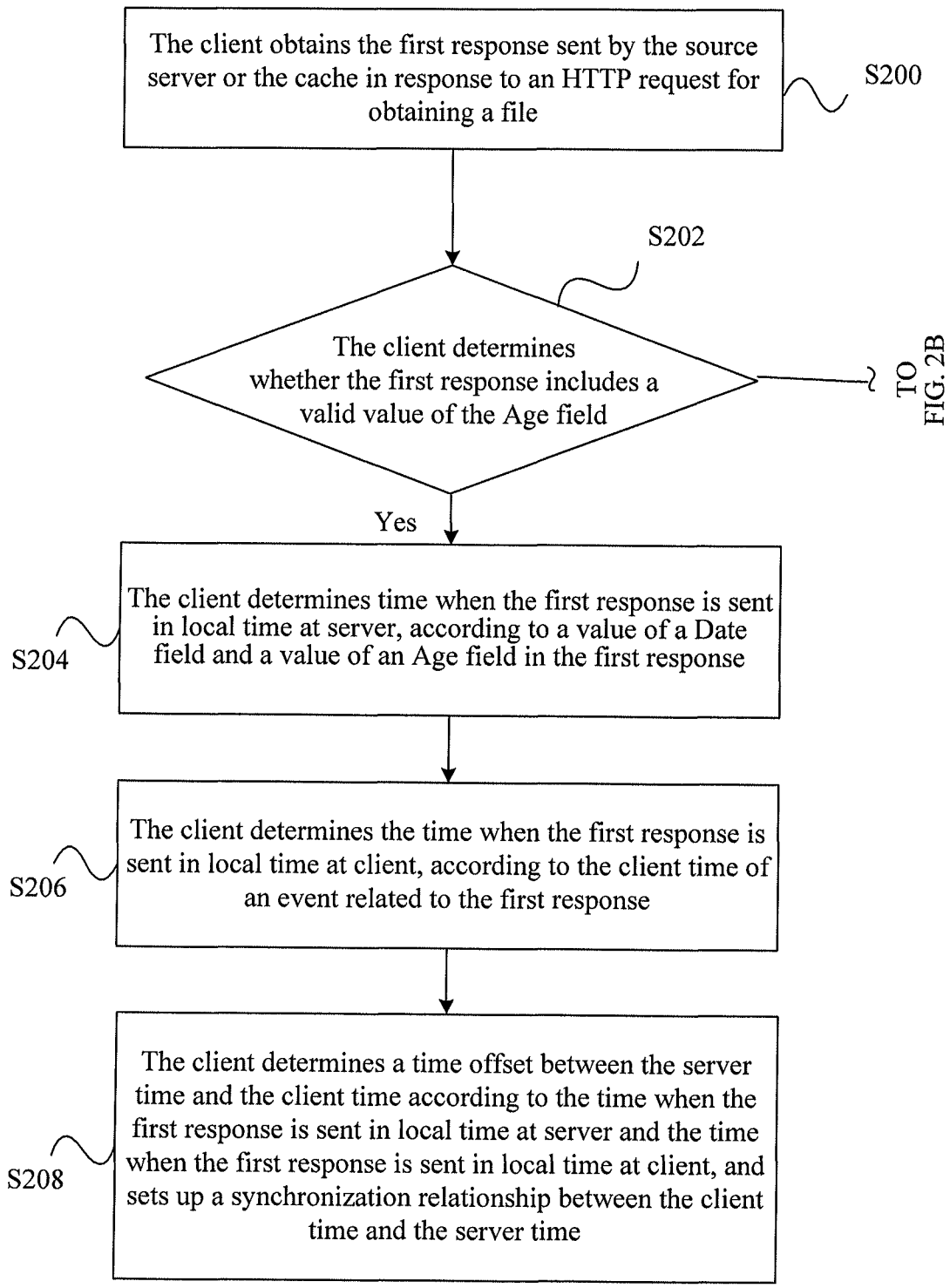
FIG. 2, which is shown as FIG. 2a and FIG. 2b, is a flowchart of an HTTP-based synchronization method according to another embodiment.
Figure 2B:
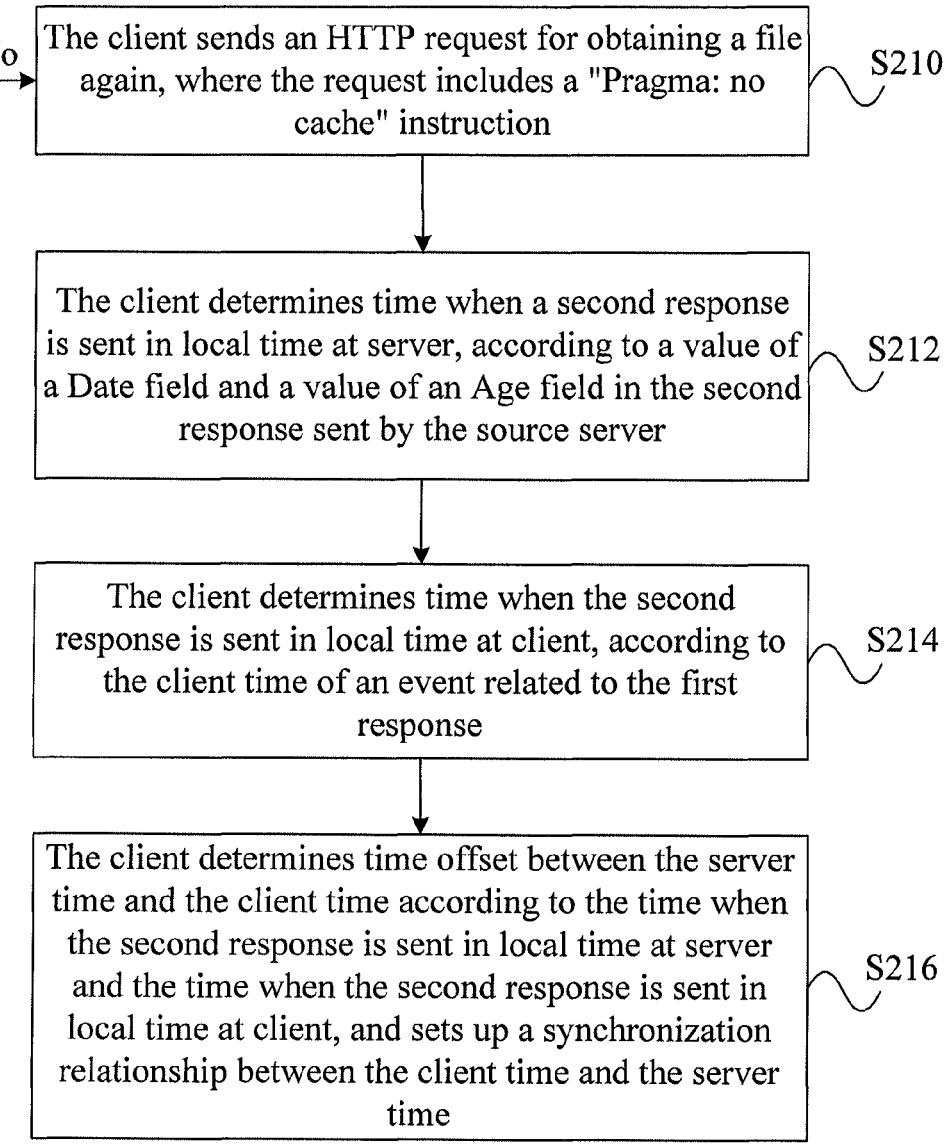

FIG. 2 is a flowchart of an HTTP-based synchronization method according to another embodiment. As shown in FIG. 2, the embodiment includes the following steps:

S200. Obtain a first response sent by a source server or a cache in response to an HTTP request for obtaining a file.

A client sends an HTTP request for obtaining a certain file located in a source server. In the embodiment, the HTTP request for obtaining the file may be a GET request. The requested file is not limited to a certain type. The step aims at obtaining an HTTP response to the request, so as to retrieve a corresponding field (header) in the response. For example, the file may be a metadata file or media presentation description file in the HTTP Streaming, or a user database file in a work attendance check system. Therefore, for HTTP Streaming, the HTTP request for obtaining a file includes an HTTP request for obtaining a metadata file or a media presentation description file.

Figure 3:
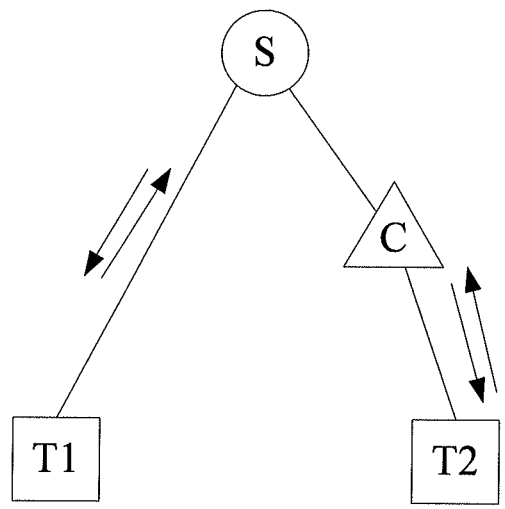
FIG. 3 is a schematic diagram of an application environment of an HTTP-based synchronization method according to an embodiment.

In the HTTP request, a URL (Uniform Resource Locator, uniform resource locator) may be used to indicate the requested file that is located in the source server. If a cache (cache) exists on a path from the client to the source server and stores a valid duplicate of the file requested by the client, the request may not be transmitted to the server. The cache responds to the request and returns the response to the client. As shown in FIG. 3, if a file requested by a client T2 is stored in a cache C on a path from the client T2 to a source server S, the cache C may respond to the request from T2. The cache in the embodiment may be a device or program.

In certain embodiments, if the client hopes that the response comes from the source server rather than from a cache on the path, the request from the client may carry a cache-related instruction such as "Pragma: no cache" or "Cache-Control: no cache". Both instructions require that the response is obtained from the source server; however, the difference lies in that: "Pragma: no cache" can be identified by a device that supports HTTP/1.0, and "Cache-Control: no cache" can be identified only by a device that supports HTTP/1.1 or higher version. When the client cannot determine that all devices on the path to the source server support HTTP/1.1, the client can use "Pragma: no cache" to request the response that comes from the source server.

The client obtains the response sent by the source server or the cache in response to the HTTP request for obtaining a file. In the embodiment, as the client interacts with server for two times, to make it clear, the HTTP response obtained by the client in this step is called a first response. The client receives the first response that includes the requested file. The first response may come from the source server or may be obtained from a cache on the path that is from the client to the source server. In the embodiment, the source server or cache that sends the first response may be called a first response sender.

The client may record the time of sending the request and the time of receiving the response. In certain embodiments, the client may record either the client time of sending the request or the client time of receiving the response.

S202. The client determines whether the first response includes a valid value of the Age field; if the first response includes the valid value of the Age field, S204 is performed; if the first response does not include the valid value of the Age field, S210 is performed.

In the embodiment, the step is an optional step. The step can be omitted if the first response certainly includes the valid value of the field "Age", or it is not taken into consideration in practical application whether the valid value of the field "Age" is included. In certain embodiments, the client determines whether the first response includes a valid value of the Age field, and decides subsequent operations.

In the embodiment, two HTTP fields (HTTP header): a Date field and an Age field may be used for determining the time of generating the first response, where the time of generating the first response is represented by the server time, as described briefly below:

An HTTP response received at the client includes a Date field. The field is generally generated by the source server to indicate generation (generation) time of the response. Figuratively speaking, the Date field indicates the "birth" time of the response. The cache does not change the Data field of the stored response. If the response is returned by the cache, the time indicated by the Date field in the response is the time before the response is sent to the client, because the response has been in the cache for a period of time.

The HTTP response received at the client may further include an Age field. The presence of the field in the response indicates that the response does not come from the source server directly but comes from the cache. The field indicates the "age" of the response as estimated by the sender of the response. That is, the field indicates a time length of existence of the response that exists since the response is generated in the source server, and the time length is equivalent to a sum of the time of the response staying in caches and the time spent in transmission.

Figure 4:
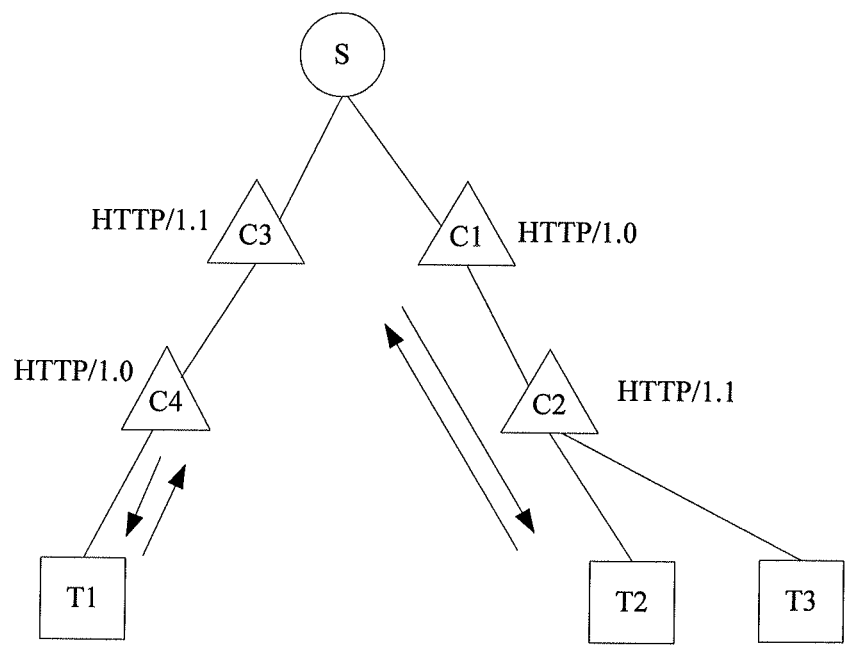
FIG. 4 is a schematic diagram of another application environment of an HTTP-based synchronization method according to an embodiment.

As regards whether the response includes a valid value of the Age field, the following cases may exist: If the response is sent by the source server, the response includes no Age field, and in this case, the value of the Age field may be set to 0, and it is regarded that the response includes a valid value of the Age field; if the response is sent by the cache, it is required to determine whether the response includes a valid value of the Age field according to a protocol supported by the cache. For example, if the cache supports HTTP/1.1 or a higher version, a valid value of the Age field may be included; if the cache only supports a version lower than HTTP/1.1, the protocol does not supports the Age field, and the response does not include a valid value of the Age field. The following gives description by referring to the example in FIG. 4:

If two levels of caches, C1 and C2, exist on the path from the client to the source server, C1 only supports HTTP/1.0, C2 supports HTTP/1.1, and if a duplicate of the requested file exists on C1, the response obtained and returned from C1 includes no Age field, and a valid value of the Age field may not be included. If two levels of caches, C3 and C4, exist on the path from the client to the source server, C3 supports HTTP/1.1, C4 only supports HTTP/1.0, the response stored in C4 is probably obtained from C3 before, and the response includes an Age field. However, when the client obtains the response from C4 directly, although the response includes the Age field, the Age field is not updated and cannot reflect the time of the stored response staying in C4. Therefore, the value of the Age field is not valid. In the present invention, the validity of the field is determined according to a protocol version of the response. The two examples given herein describe circumstances that the Age field may not necessarily be valid although the HTTP response includes the Age field. The examples described herein are not exhaustive.

Therefore, when the first response comes from the cache, whether the first response includes a valid value of the Age field can be determined according to the HTTP protocol version in the first response. For example, if the version is HTTP/1.1 or a higher version, the first response includes a valid Age field; if the protocol version is lower than HTTP/1.1, the first response may include no Age field or carry an invalid Age field. That is to say, if the protocol version is not lower than HTTP/1.1, no matter whether the first response comes from the source server or from the buffer, the first response includes a valid value of the Age field. That is, if the first response comes from the source server, the value of the Age field is set to 0, and in certain embodiments, the value of the Age field may also be set to another value, for example, the value of the Age field may be set to a value other than 0 when transmission, delay and the like are considered. Therefore, if the first response comes from the source server, the value of the Age field may be set to a specific value. The specific value may be determined according to experiences. For ease of description, it is assumed that the value is 0 in the following description, which shall not be construed as restriction on the embodiments. If the first response comes from the buffer, the value of the Age field is the time of existence of the first response that exists since the first response is generated; otherwise, if the protocol version is lower than 1.1, and the first response comes from the cache, the first response includes no valid value of the Age field. In the embodiment, the client and the source server employ HTTP/1.1 or a higher version by default, but this restriction is not imposed on the cache in the network.

It can be seen that the value of the Age field included in the first response is valid only if the HTTP version supported by the sender of the first response is HTTP/1.1 or a higher version. In this way, the client can determine the HTTP protocol version of the first response. If the HTTP version supported by the sender of the first response is HTTP/1.1 or a higher version, it is determined that the first response includes a valid value of the Age field; if the HTTP version supported by the sender of the first response is lower than HTTP/1.1, it is determined that the first response includes no valid value of the Age field.

As mentioned above, the step of determining whether the sender of the first response supports HTTP/1.1 or a higher version is optional. The step can be omitted if HTTP/1.1 or a higher version is supported by the source server and all caches on the path from the client to the source server, or if whether HTTP/1.1 is supported or not may not be considered in practical application.

The client may determine the protocol version through a state line of the first response. The format of an HTTP response is as follows:

HTTP-Version SP Status-Code SP Reason-Phrase CRLF
*((general-header|response-header|entity-header) CRLF)
CRLF
[message-body]

The detailed interpretation involves expression of the HTTP protocol. Reference can be made to IETF RFC2616, details are not given herein.

In conclusion, if the value of the Age field is required to be used for subsequent operations, the client needs to determine whether the received first response includes a valid value of the Age field, namely, determine whether the sender of the first response supports the protocol version. If it is determined that the first response includes a valid value of the Age field, S204 is performed; if it is determined that the first response includes no valid value of the Age field, S210 is performed.

It should be noted that the specific protocol version given above only serves as an example in the embodiment, and shall not be construed as limitation on the present invention. In practical application, another protocol version can be used as a basis of identification; or in version evolution, HTTP/1.1 may not be used as a differentiator, but HTTP/1.2, HTTP/1.3, ..., or HTTP/1.x may be used as the differentiator. For example, when it is required that a value of the Age field in the first response is valid only if the HTTP version supported by the sender of the first response is HTTP/1.3 or a higher version. Therefore, determining whether the first response includes a valid value of the Age field includes: determining whether the sender of the first response supports a certain HTTP protocol version, that is, determining that the first response includes a valid value of the Age field includes: determining that the sender of the first response supports a certain HTTP protocol version. In other embodiments, other methods may be used to determine whether the first response includes a valid value of the Age field. For example: according to a Via field (HTTP header) in the HTTP protocol, the path of the response is judged, and validity of the Age field is determined. Therefore, other methods for determining whether the first response includes a valid value of the Age field also fall within the protection scope. For ease of description, the embodiment takes HTTP/1.1 or a higher version, and a version lower than HTTP/1.1 as examples.

S204. The client determines time when the first response is sent in local time at server, according to a value of a Date field and a value of an Age field in the first response.

Figure 5:
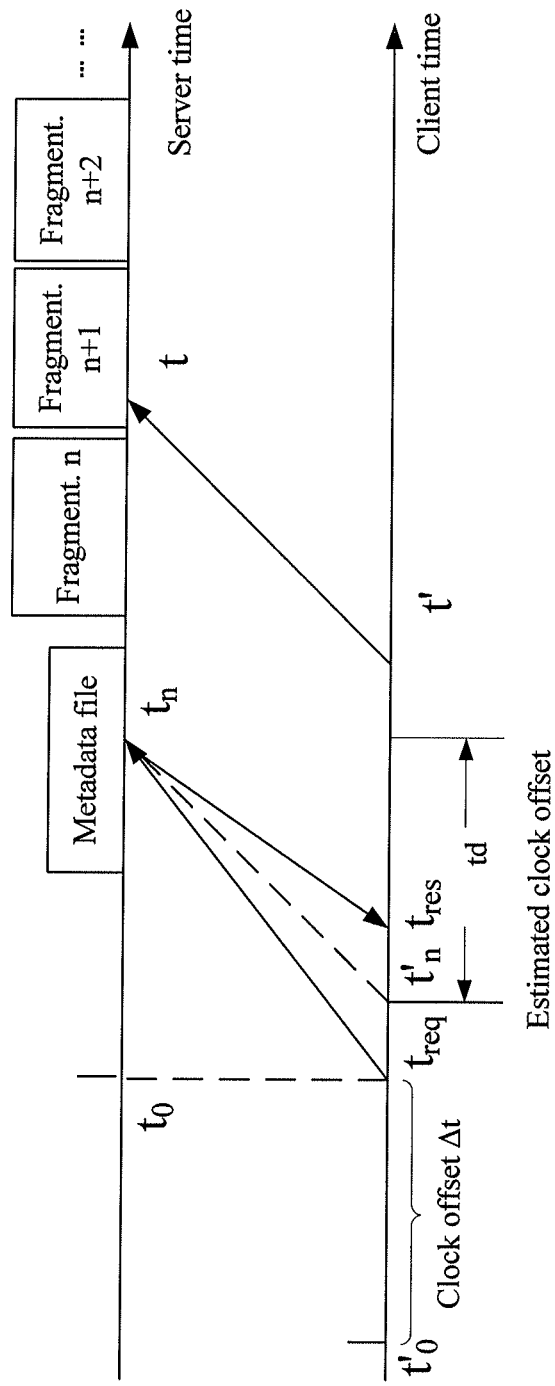
FIG. 5 is a schematic diagram of implementing an HTTP-based synchronization method in HTTP media streaming according to an embodiment.

To make the solution clearer, the following describes an HTTP streaming application as an example with reference to FIG. 5. In FIG. 5, $\Delta t$ represents an actual time offset between server time $t_0$ and client time $t'_0$, and $t_d$ represents time offset determined according to the method disclosed in the embodiment.

The first response may include a Date field. Therefore, if the first response received by the client includes a valid value of the Age field, the time when the first response is sent in local time at server may be determined according to values of the two fields. The following calculation method may be adopted:

$$t_n = t_{date} + t_{age}, \text{where}$$

$t_{date}$ is a value of the Date field, and is represented in a form suitable for operation; $t_{age}$ is a value of the Age field, and is represented in a form suitable for operation; in a case that the sender of the first response supports HTTP/1.1 or a higher version, the Age field included in a message indicates that the message does not come from a source server, but comes from a cache. If the first HTTP response includes no Age field, it indicates that the message comes from the source server, and the value of $t_{age}$ is 0. $t_n$ is the time when the first response is sent in local time at server.

The method described above is only an example of determining, according to the value of the Date field and the value of the Age field in the first response, the time when the first response is sent in local time at server. Variations may be derived on the basis of the method. For example, a weighted value or a corrected value is set when the impact caused by transmission, delay and the like is considered.

S206. The client determines the time when the first response is sent in local time at client, according to the local time of an event related to the first response.

In the embodiment, the client sending the request and receiving the first response may be collectively called an event related to the first response. The client may record the time of the event related to the first response. The time is represented by the client time, and therefore the time may be called client time of the event related to the first response. The client can record the local time of the event related to the first response in different ways: The client may record the time of sending the request and the time of receiving the first response, or record only the time of sending the request, or record only the time of receiving the first response. Determining the time when the first response is sent in local time at client according to the local time of the event related to the first response includes: determining the time when the first response is sent in local time at client, according to the local time at client when the HTTP request is sent and/or the local time at client when the HTTP response is received.

The client may determine the time when the first response is sent in local time at client, according to the local time of the event related to the first response. There are different ways to make the determining. Several determining methods are given in the embodiments, but shall not be construed as limitation on the embodiments.

In view of causality, the time of sending the first response by the source server or the cache is certainly subsequent to the time ($t_{req}$) of sending the request by the client, and is before the time ($t_{res}$) of receiving the first response by the client, and $t'_n$ is used to indicate the time when the first response is sent in local time at client. Then, $$t_{req} < t'_n < t_{res}$$

In certain embodiments, the client may estimate the time of sending the first response, according to the foregoing relationship. One estimation method is arithmetic averaging:

$$t'_n = (t_{req} + t_{res})/2$$

Generally, a time interval between the time of sending the request by the client and the time of receiving the first response is very short, such as hundreds of milliseconds, and time and a time length that are represented by Date and Age are generally accurate to seconds. Therefore, in certain embodiments, time difference between the time of sending the request by the client and the time of receiving the first response can be ignored, and $t_{req}$ or $t_{res}$ is an approximate estimate of $t'_n$. That is, $$t'_n = t_{req} \text{ or } t'_n = t_{res}$$

In other embodiments, the time spent in transmitting the request and the first response may be further considered, namely, the time spent in transmitting the request from the client to the sender of the first response, and the time spent in returning the first response to the client. For example, if a file requested by the client is small, the time spent in transmitting the request may be close to the time spent in transmitting the first response, and the time when the first response is sent is between the time when the client sends the request and the time when the client receives the first response. If the requested file is large, the time spent in transmitting the first response may be longer than the time spent in transmitting the request, and the time point of returning the first response is close to the time of sending the request by the client.

S208. The client determines time offset between the server time and the client time, according to the time when the first response is sent in local time at server and the time when the first response is sent in local time at client, and sets up a synchronization relationship between the client time and the server time.

The time when the first HTTP response is sent in local time at client and the time when the first HTTP response is sent in local time at server are obtained in the step, and then an offset of the server time relative to the client time can be obtained:

$t_d = t_n - t'_n$, where $t_d$ denotes the offset of the server's time relative to that of the client, or time difference between the server time and the client time.

In this way, a time synchronization relationship is set up between the client and the server. According to a clock offset between the server and the client, the client time can be mapped to the server time, or conversely the server time can be mapped to the client time:

$t = t' + t_d$, where t' represents the client time, and t represents the server time.

In certain embodiments, the foregoing process may be repeated to obtain multiple HTTP request/response pairs; or a more accurate time offset estimate is obtained by calculating or selecting the request/response with little time difference.

S210. The client sends an HTTP request for obtaining a file again, where the request includes a "Pragma: no cache" instruction.

If the client determines that the first response that is received includes no valid value of the Age field, the client resends an HTTP request for obtaining a file, to request obtaining a certain file located in a source server. At this time, the request that is resent includes a cache-related instruction. To make a version lower than HTTP/1.1 be identifiable to a cache, the cache instruction included in the request is "Pragma: no cache".

By including the "Pragma: no cache" instruction in the request, a response is forced to come from the source server, so as to prevent a problem that accuracy of synchronization is affected due to the lack of a valid value of the Age field. In the embodiment, the response sent by the source server may be called a second response.

S212. The client determines the time when the second response is sent in local time at server, according to the value of the Date field and the value of the Age field in the second response sent by the source server.

In the embodiment, after the client sends a request that includes a "Pragma: no cache" instruction, the client receives a second response from the source server. Since the second response comes from the source server, as mentioned above, the value of the Age field is 0, and the time when the second response is sent in local time at server can be determined by using the method described in S204.

S214. The client determines the time when the second response is sent in local time at client, according to the local time of an event related to the second response.

S216. The client determines time offset between the server time and the client time, according to the time when the second response is sent in local time at server and the time when the second response is sent in local time at client, and sets up a synchronization relationship between the client time and the server time.

For the detailed method of implementing S212 to S216, reference can be made to the description in S204 to S208 for implementation, and details are not repeated herein. The difference lies in that the second response replaces the first response. The first response and the second response may be uniformly expressed as "response". In certain embodiments, the time when the response is sent in local time at server is determined according to the value of the Date field and the value of the Age field in the response, i.e.: $t_n = t_{date} + t_{age}$, where $t_{date}$ is the value of the Date field, $t_{age}$ is the value of the Age field, and $t_n$ is the time at server when is sent. If the response comes from the source server, $t_{age} = 0$. The determining, according to the client time of the event related to the response, the time when the response is sent in local time at client may be: according to the time when the HTTP request is sent in local time at client and/or the time when the HTTP response is received in local time at client, determining the time when the response is sent in local time at client.

In the technical solutions provided in the embodiment, the time when the first response is sent in local time at server is determined according to the value of the Date field and the value of the Age field in the first response, and the time offset between the server time and the client time is determined according to the time when the first response is sent in local time at server and the time when the first response is sent in local time at client, so as to set up the synchronization relationship between the client time and the server time. In this way, the mechanism in the existing HTTP protocol is made full use of, the existing mechanism is not required to be extended, communication overhead is not additionally increased between the client and the server, no bandwidth is consumed, and no delay of service processing is increased. Moreover, the cache is utilized efficiently, and the server load is relieved. In conclusion, the technical solutions provided in the embodiment effectively solve the problem of synchronization between the client time and the server time. In another aspect, the technical solutions provided in the embodiment sufficiently consider that different HTTP protocol versions support the Age field. Therefore, different time synchronization processes are adopted in different circumstances, and the application scope of the method is widened, so as to ensure synchronization accuracy if the cache includes no valid value of the Age field in certain circumstances.

The following further describes embodiments of an HTTP-based synchronization method presented in the present invention in context of certain applications, such as HTTP streaming and a work attendance system. Apparently, the present invention is not limited to the above applications.

In an HTTP Streaming service, media contents are split into a series of media fragments in time order. A client requests a file that includes the media fragments, and streams the media fragments sequentially. A general process of the HTTP streaming service is as follows:

S300. The client obtains basic information about media content access through a media presentation description file (Media presentation description file). The basic information, for example, is: whether a service type is live streaming or video on demand, a time length of a media fragment, and the like; attributes of the media contents such as a media component and an encoding rate and the like; how to access the contents and the like.

S302: The client obtains a metadata file.

The metadata file includes a special media fragment, which describes features of media data but includes no media sample sequence. The client configures a player correctly according to the obtained metadata file, and then processes a subsequent media fragment.

The client obtains the metadata file in the same way as obtaining other media fragment files, and both are obtained through an HTTP protocol. The client generates a uniform resource locator URL of the metadata file according to the media presentation description file, and sends an HTTP request. A source server or a cache on the path returns the file through an HTTP response.

S304. The client requests downloading media fragments and then sequentially streams the media fragments. Before the step, the client needs to implement time synchronization with the server.

If the client determines that the service type is live streaming according to the media presentation description file obtained in S300, the client can set up synchronization between client time and server time in S302 by using the HTTP-based synchronization method according to the embodiment.

Although only a live streaming service requires setup of synchronization between the client and the server, the synchronization does not affect non-live streaming (video on demand) services, and obtaining the metadata file is a necessary step of the HTTP Streaming. Therefore, the synchronization can be always set up in S302 without learning a service type.

The media presentation description file can be transmitted to a client in different modes, such as a short message, an HTTP and the like. If the client obtains the media presentation description file in an HTTP mode, the method may also be applied in S300 to set up synchronization between the client time and the server time.

Figure 6:
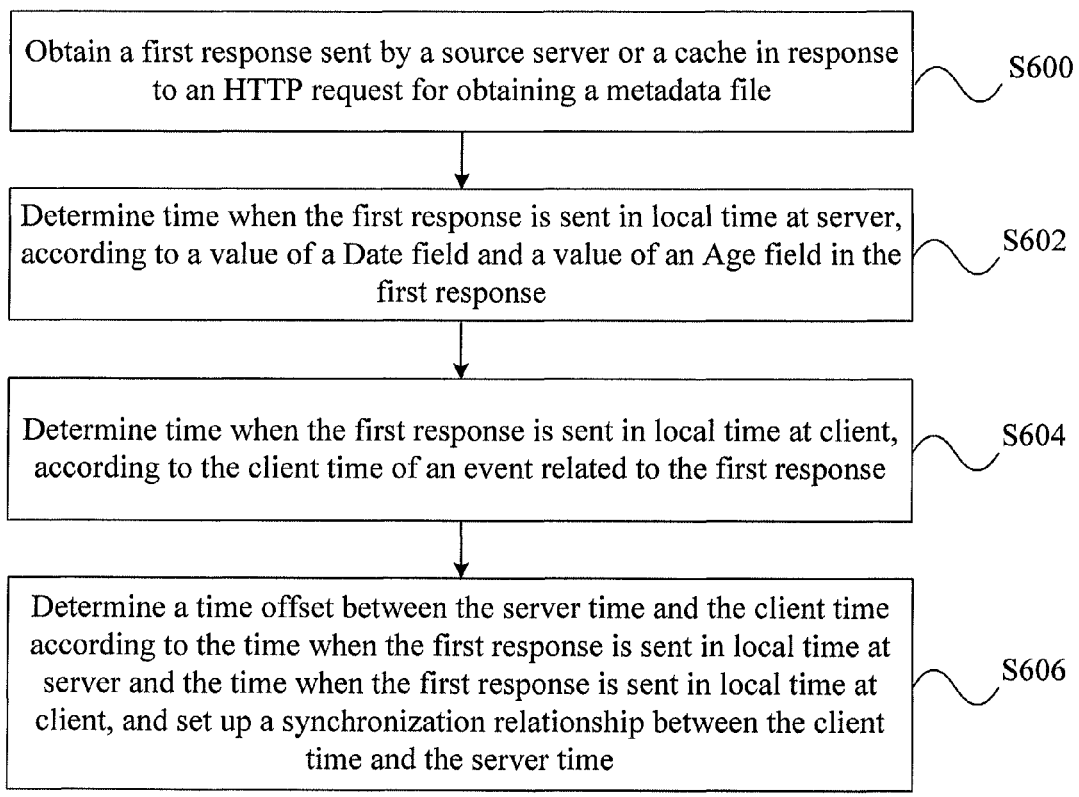
FIG. 6 is a flowchart of an HTTP streaming synchronization method according to an embodiment.

FIG. 6 is a flowchart of an HTTP streaming synchronization method according to an embodiment. As shown in FIG. 6, the embodiment includes the following steps:

S600. Obtain a first response sent by a source server or a cache in response to an HTTP request for obtaining a metadata file.

S602. Determine time when the first response is sent in local time at server, according to a value of a Date field and a value of an Age field in the first response.

S604. Determine time when the first response is sent in local time at client, according to the client time of an event related to the first response.

S606. Determine time offset between the server time and the client time according to the time when the first response is sent in local time at server and the time when the first response is sent in local time at client, and set up a synchronization relationship between the client time and the server time.

In the technical solutions provided in the embodiment, the time when the first response is sent in local time at server is determined according to the value of the Date field and the value of the Age field in the first response, and the time offset between the server time and the client time is determined according to the time when the first response is sent in local time at server and the time when the first response is sent in local time at client, so as to set up the synchronization relationship between the client time and the server time. In this way, the mechanism in the existing HTTP protocol is made full use of, and the problem of synchronization between the client time and the server time is solved effectively without additionally increasing communication overhead between a client and a server.

Figure 7A:
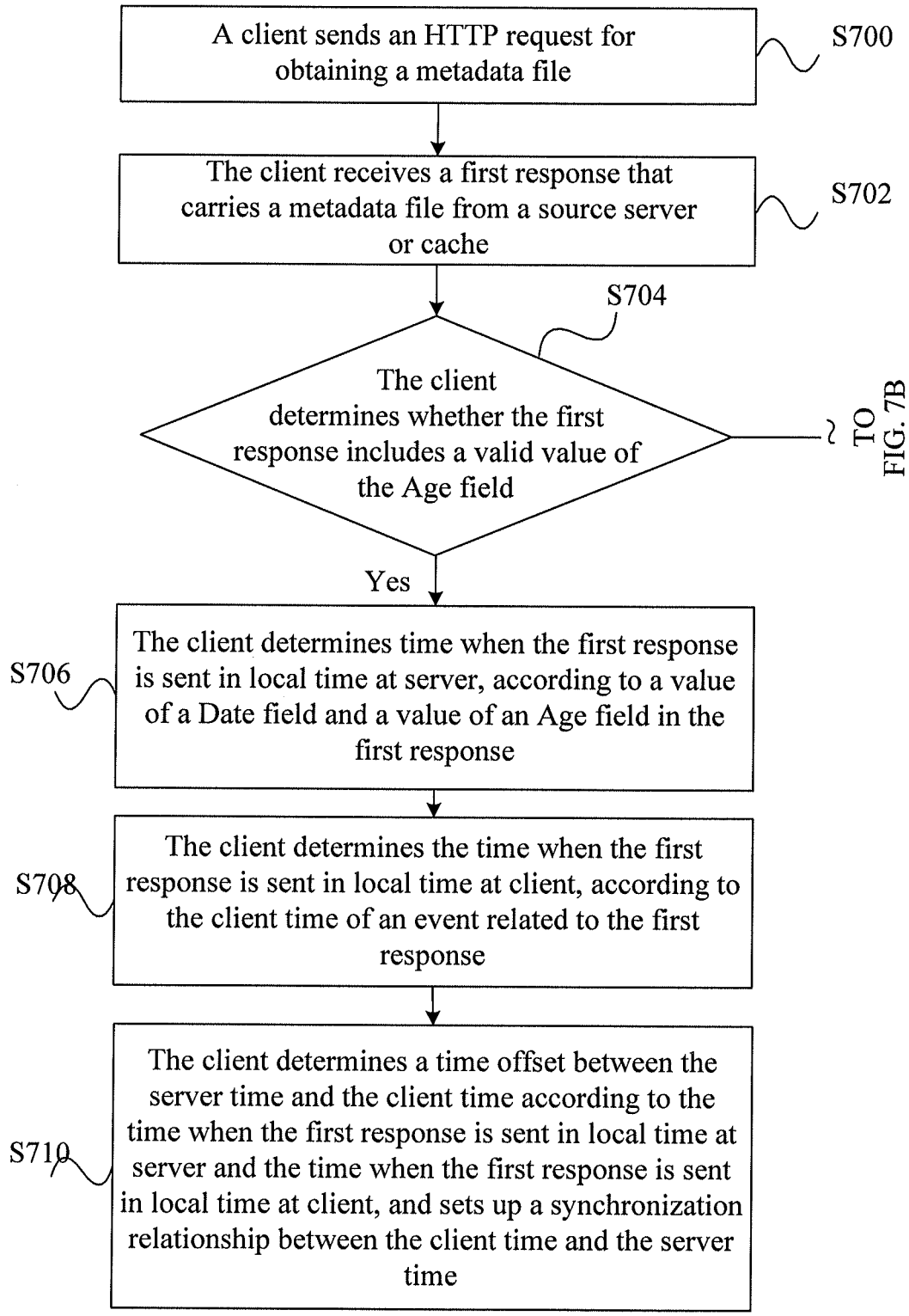
FIG. 7, which is shown as FIG. 7a and FIG. 7b, is a flowchart of an HTTP streaming synchronization method according to another embodiment.
Figure 7B:
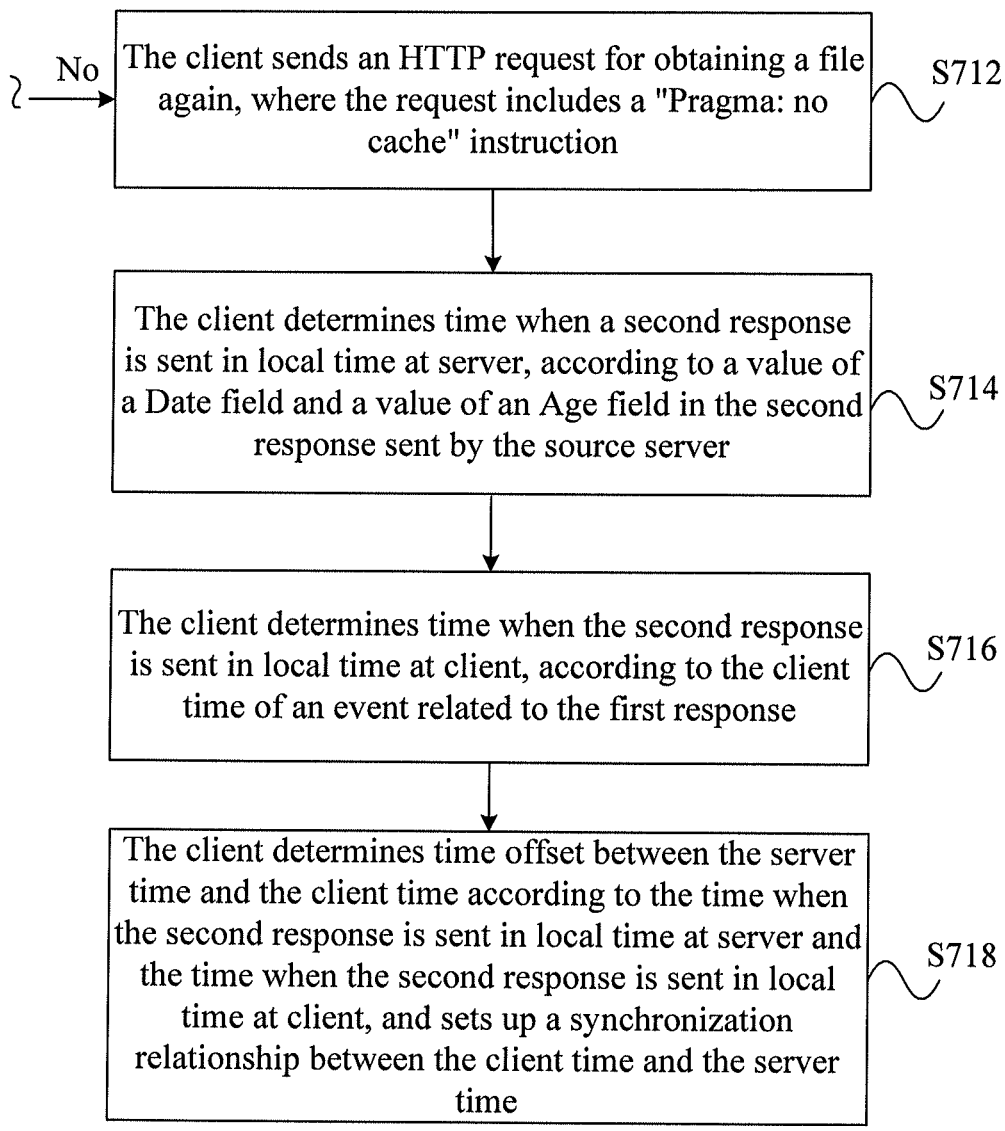

FIG. 7 is a flowchart of an HTTP streaming synchronization method according to another embodiment. As shown in FIG. 7, the embodiment includes the following steps:

S700: A client sends an HTTP request for obtaining a metadata file. In certain embodiments, the client may send a request for obtaining a media presentation description file. In certain embodiments, the request can carry a "Pragma: no cache" instruction or a "Cache-Control: no cache" instruction, so as to specify that the response is requested from the source server.

S702. The client receives a first response that carries the metadata file and is sent by a source server or cache.

S704. The client determines whether the first response includes a valid value of an Age field; if the first response includes the valid value of the Age field, S706 is performed; if the first response does not include the valid value of the Age field, S712 is performed. As mentioned above, the step is optional.

S706. The client determines time when the first response is sent in local time at server, according to a value of a Date field and a value of an Age field in the first response.

S708. The client determines the time when the first response is sent in local time at client, according to the client time of an event related to the first response.

S710. The client determines time offset between the server time and the client time according to the time when the first response is sent in local time at server and the time when the first response is sent in local time at client, and sets up a synchronization relationship between the client time and the server time.

S712. The client sends an HTTP request for obtaining a metadata file again, where the request includes a "Pragma: no cache" instruction.

S714. The client determines the time when a second response is sent in local time at server, according to the value of the Date field and the value of the Age field in the second response sent by the source server.

S716. The client determines the time when the second response is sent in local time at client, according to the client time of an event related to the second response.

S718. The client determines time offset between the server time and the client time, according to the time when the second response is sent in local time at server time and the time when the second response is sent in local time at client, and sets up a synchronization relationship between the client time and the server time.

Because the HTTP-based synchronization method is described in detail in the preceding embodiments, details of the steps of the HTTP streaming synchronization method are not given herein any further. For details, reference can be made to the embodiment shown in FIG. 2.

The HTTP-based synchronization method may also be applied in a work attendance system, as described briefly below: A work attendance system is also a time recording system, and includes a source server and several clients distributed in different places. Clients here may be work attendance terminals. The source server is connected with a client through an Internet or other IP network, and a cache may exist on a path between the source server and the client. The time of the source server is the same as the time of the cache, a uniform time reference is provided for the clients, and consistency of time of all clients is ensured. Besides, the source server stores a database of a user, and collects a time record of each client. A client reads data of a user through a card reader, and records time of a user operation.

When the client starts working, the client requests a user database file on the source server first through an HTTP protocol. When the requested database file is located in a cache, the cache may make a response. In the process of obtaining the user database file, synchronization is set up between the server time and the client time. Upon completion of the synchronization, the client can work independently, uniform server time is displayed, the time of the user operation is recorded, and recorded data is transmitted to a server at specified time.

For the detailed method of time synchronization, reference can be made to the description of the preceding embodiment, and the details are not repeated herein.

Figure 8:
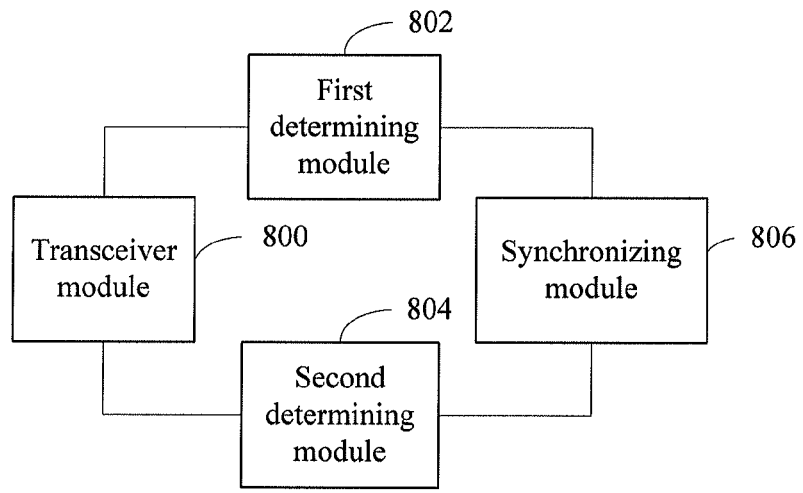
FIG. 8 is a schematic structural diagram of an HTTP-based synchronization apparatus according to an embodiment.

FIG. 8 is a schematic structural diagram of an HTTP-based synchronization apparatus according to an embodiment. As shown in FIG. 8, the embodiment includes:

a transceiver module 800, configured to obtain a first response sent by a source server or a cache in response to an HTTP request for obtaining a file;

a first determining module 802, configured to determine time when the first response is sent in local time at server, according to a value of a Date field and a value of an Age field in the first response obtained by the transceiver module 800;

a second determining module 804, configured to determine time when the first response is sent in local time at client, according to the client time of an event related to the first response; and a synchronizing module 806, configured to determine time offset between the server time and the client time according to the time when the first response is sent in local time at server determined by the first time determining module, and the time when the first response is sent in local time at client determined by the second time determining module, and set up a synchronization relationship between the client time and the server time.

In the apparatus provided in the embodiment, the time when the first response is sent in local time at server is determined according to the value of the Date field and the value of the Age field in the first response, and the time offset between the server time and the client time is determined according to the time when the first response is sent in local time at server and the time when the first response is sent in local time at client, so as to set up the synchronization relationship between the client time and the server time. In this way, the mechanism in the existing HTTP protocol is made full use of, and a problem of synchronization between the client time and the server time is solved effectively without additionally increasing communication overhead between a client and a server.

Figure 9:
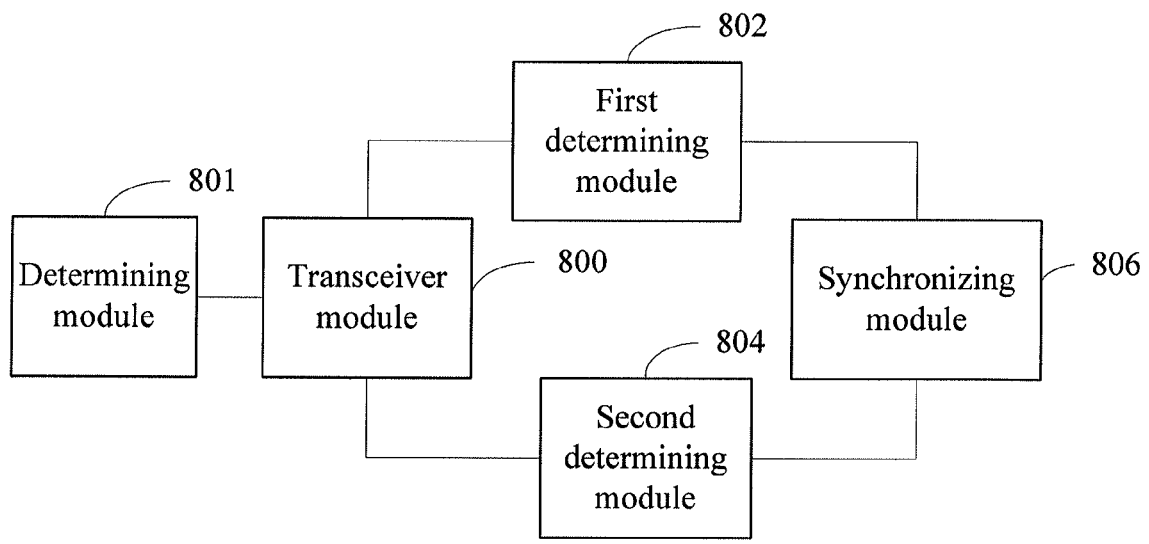
FIG. 9 is a schematic structural diagram of an HTTP-based synchronization apparatus according to another embodiment.

In certain embodiments, as shown in FIG. 9, the HTTP-based synchronization apparatus may further include a judging module 801, which is configured to determine whether the first response includes a valid value of the Age field. The judging module 801 can determine whether the first response includes a valid value of the Age field by determining whether a sender of the first response supports a certain HTTP protocol version.

If the judging module 801 determines that the first response includes no valid value of the Age field, the transceiver module 800 is further configured to send an HTTP request for obtaining a file again, where the request includes a "Pragma: no cache" instruction;

the first determining module 802 is further configured to determine time when a second response is sent in local time at server, according to a value of a Date field and a value of an Age field in the second response that is sent by the source server and is obtained by the transceiver module 800;

the second determining module 804 is further configured to determine time when the second response is sent in local time at client, according to the client time of an event related to the second response;

the synchronizing module 806 is configured to determine time offset between the server time and the client time according to the time when the second response is sent in local time at server determined by the first determining module 802, and the time when the second response is sent in local time at client determined by the second determining module 804, and set up a synchronization relationship between the client time and the server time.

In certain embodiments, the HTTP request that is for obtaining a file and is sent by the transceiver module 800 may include a "Pragma: no cache" instruction or a "Cache-Control: no cache" instruction, to require the obtained first response to come from the source server.

In certain embodiments, the first determining module 802 determines the time of sending the response according to the value of the Date field and the value of the Age field in the response in the following way:

$t_n = t_{date} + t_{age}$, where $t_{date}$ is a value of the Date field, $t_{age}$ is a value of the Age field, and $t_n$ is the time when the response is sent in local time at server.

If the response comes from the source server, $t_{age} = 0$.

In certain embodiments, when the second determining module 804 determines the time when the response is sent in local time at client, according to the client time of an event related to the response, the time when the response is sent in local time at client may be determined according to the time when the HTTP request is sent in local time at client by the transceiver module 800 and/or the time when an HTTP response is received in local time at client.

In an HTTP Streaming application environment, an HTTP request sent by the transceiver module 800 for obtaining a file may be an HTTP request for obtaining a metadata file, or an HTTP request for obtaining a media presentation description file.

The following further describes the HTTP-based synchronization apparatus with reference to the method embodiment shown in FIG. 2 and the flowchart:

The apparatus includes a transceiver module 800, a first determining module 802, a second determining module 804, a synchronizing module 806, and a judging module 801. The transceiver module 800 obtains a first response sent by a source server or a cache in response to an HTTP request for obtaining a file. The judging module 801 determines whether the first response includes a valid value of an Age field.

If it is determined that the first response includes the valid value of the Age field, the first determining module 802 determines time when the first response is sent in local time at server, according to a value of a Date field and the value of the Age field in the first response.

The second determining module 804 determines time when the first response is sent in local time at client, according to the client time of an event related to the first response.

The synchronizing module 806 determines time offset between the server time and the client time according to the time when the first response is sent in local time at server and the time when the first response is sent in local time at client, and sets up a synchronization relationship between the client time and the server time.

As mentioned above, the step of the judging module 801 determining whether the first response includes the valid value of the Age field is an optional step.

In certain embodiments, if the judging module 801 determines that the first response includes no valid Age field, the transceiver module 800 sends an HTTP request for obtaining a file again, where the request includes a "Pragma: no cache" instruction;

the first determining module 802 determines time when a second response is sent in local time at server, according to a value of a Date field and a value of an Age field in the second response sent by the source server;

the second determining module 804 determines time when the second response is sent in local time at client, according to the client time of an event related to the second response;

the synchronizing module 806 determines time offset between the server time and the client time according to the time when the second response is sent in local time at server and the time when the second response is sent in local time at client, and sets up a synchronization relationship between the client time and the server time.

The HTTP-based synchronization apparatus in the foregoing embodiment is used for implementing the HTTP-based synchronization method. Because the preceding method embodiments describe the HTTP-based synchronization method in detail, details about how the HTTP-based synchronization apparatus implements the method are only illustrated briefly. For more details, reference can be made to the contents of the preceding method embodiments.

The HTTP-based synchronization apparatus provided in the embodiment may exist in multiple terminal devices, including a mobile phone, computer, and work attendance recording machine.

Persons of ordinary skill in the art should understand that all or part of the steps of the method may be implemented by a program instructing relevant hardware. The program may be stored in computer readable storage media. When the program runs, the procedure of each embodiment mentioned above may be executed. The storage media may be a magnetic disk, compact disk, read-only memory (Read-Only Memory, ROM), or random access memory (Random Access Memory, RAM).

The above are merely exemplary embodiments. It should be noted that those skilled in the art can make modifications and variations without departing from the principle of the invention. Those modifications and variations should fall within the protection scope of the claims.

What is claimed is:

1. A hypertext transport protocol (HTTP)-based synchronization method comprising:
    obtaining a first response from a source server or a cache in response to an HTTP request to obtain a file, wherein the first response defines a date value and an age value;
    after obtaining the first response, determining that the age value is a valid value for an age field;
    computing a first time based on the date value and the age value, wherein the date value corresponds to a date when the first response was sent and is specified in a local time of the source server;
    converting the first time to a local time of a client based upon a second time that is a local time of the client at which an event associated with the first response occurs at the client;
    computing a difference between the second time and the first time to thereby determine a time offset between a clock of the source server and a clock of the client; and
    setting up, by the client, a synchronization relationship between the client time and the server time.

2. The method according to claim 1, wherein determination that the first response comprises the valid value of the age field comprises:
    determining that a sender of the first response supports a certain HTTP protocol version.

3. The method according to claim 1, wherein:
    the HTTP request for obtaining the file comprises a "Pragma: no cache" instruction or "Cache-Control: no cache" instruction; and
    the obtained first response comes from the source server.

4. The method according to claim 1: wherein the first time, $t_n$, is computed according to the following calculation:

$$t_n = t_{date} + t_{age}, \text{wherein}$$

$t_{date}$ is the value of the date field, $t_{age}$ is the value of the age field.

5. The method according to claim 4, wherein:
    if the response comes from the source server, $t_{age}=0$.

6. The method according to claim 1: wherein the second time corresponds to a time at which the HTTP request is sent or a time at which an HTTP response is received.

7. The method according to claim 1, wherein the HTTP request for obtaining the file comprise:
    an HTTP request for obtaining a metadata file or a media presentation description file.

8. A hypertext transport protocol (HTTP)-based synchronization method comprising:
    obtaining a first response from a source server or a cache in response to an HTTP request to obtain a file;
    computing a first time based on a date value and an age value defined in the first response, wherein the date value corresponds to a date when the first response was sent and is specified in a local time of the source server;
    converting the first time to a local time of a client based upon a second time that is a local time of the client at which an event associated with the first response occurs at the client,
    computing a difference between the second time and the first time to thereby determine a time offset between a clock of the source server and a clock of the client; and
    setting up, by the client, a synchronization relationship between the client time and the server time,
    wherein after obtaining the first response, the method further comprises:
    determining that the value of the age field in the first response is invalid;
    sending the HTTP request for obtaining the file again, wherein the HTTP request comprises a "Pragma: no cache" instruction;
    second response from the source server;
    computing a third time based on a date value and an age value defined in the second response, wherein the date value corresponds to a date, wherein the date value corresponds to a date when the second response was sent and is specified in a local time of the source server;
    convert the third time to a local time of the client based upon a fourth time at which an event associated with the second response occurs at the client;
    computing a difference between the forth time and the third time to thereby determine a time offset between a clock of the server time and a clock of the client; and
    setting up the synchronization relationship between the client time and the server time.

9. An hypertext transport protocol (HTTP) based synchronization apparatus, comprising:
    a computer in communication with a non-transitory computer readable storage medium, wherein the storage medium includes instruction code that causes the computer to:

implement a transceiver module configured to obtain a first response from a source server or a cache in response to an HTTP request for obtaining a file;

implement a first determining module configured to compute a first based on a date value and an age value defined in the first response, wherein the date value corresponds to a date time when the first response was sent and is specified in a local time of the server;

implement a second determining module configured to convert the first time to a local time of the client based upon a second time that is a local time of the client at which an event associated with the first response occurs at the client; and implement a synchronizing module configured to compute a difference between the second time and the first time to thereby determine a time offset between a clock of the source server and a clock of the client time, and to set up a synchronization relationship between the client time and the server time, wherein the instructions code is executable by the computer to implement a judging module configured to determine whether the first response comprises a valid value of the age field.

10. The apparatus according to claim 9, wherein if the judging module determines that the first response does not comprise a valid value for the age field, the transceiver module is further configured to send a subsequent HTTP request for obtaining the file, wherein the request comprises a "Pragma: no cache" instruction;

the first determining module is further configured to compute a third time based on a date value and an age value defined in a second response, wherein the date value corresponds to a date, wherein the date value corresponds to a date when the second response was sent and is specified in a local time of the server;

the second determining module is further configured to convert the third time to a local time of the client based upon a fourth time at which an event associated with the second response occurs at the client;

the synchronizing module is configured to compute a difference between the third time and the fourth time to thereby determine a time offset between a clock of the server and a clock of the client, and to set up a synchronization relationship between the client time and the server time.

\* \* \* \* \*

UNITED STATES PATENT AND TRADEMARK OFFICE
CERTIFICATE OF CORRECTION

PATENT NO. : 8,990,429 B2
APPLICATION NO. : 13/492480
DATED : March 24, 2015
INVENTOR(S) : Shaobo Zhang Page 1 of 1

It is certified that error appears in the above-identified patent and that said Letters Patent is hereby corrected as shown below:

In the Claims

In column 16, claim 8, line 48, before "second response from" insert --receiving a--.

Signed and Sealed this
Fourth Day of August, 2015

Michelle K. Lee
*Director of the United States Patent and Trademark Office*